(12) United States Patent
Selén et al.

(10) Patent No.: US 10,256,882 B2
(45) Date of Patent: Apr. 9, 2019

(54) METHOD AND NETWORK NODE FOR BROADCASTING

(71) Applicant: Telefonaktiebolaget LM Ericsson (publ), Stockholm (SE)

(72) Inventors: Yngve Selén, Uppsala (SE); Jonas Kronander, Knivsta (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 320 days.

(21) Appl. No.: 15/103,328

(22) PCT Filed: Dec. 12, 2013

(86) PCT No.: PCT/EP2013/076403
§ 371 (c)(1),
(2) Date: Jun. 10, 2016

(87) PCT Pub. No.: WO2015/086079
PCT Pub. Date: Jun. 18, 2015

(65) Prior Publication Data
US 2016/0329943 A1 Nov. 10, 2016

(51) Int. Cl.
*H04B 7/06* (2006.01)
*H04B 7/0408* (2017.01)
(52) U.S. Cl.
CPC ......... *H04B 7/0617* (2013.01); *H04B 7/0408* (2013.01); *H04B 7/0695* (2013.01)

(58) Field of Classification Search
CPC . H04B 7/0617; H04B 7/0408; H04B 7/18578
USPC ..... 455/3.01–3.06, 456.1–457, 414.1–414.4, 455/422.1, 403, 445, 427, 429, 12.1, 455/550.1, 426.1, 426.2, 500, 517, 561, 455/562.1, 552.1, 553.11; 370/328, 329, 370/310, 316
See application file for complete search history.

(56) References Cited

U.S. PATENT DOCUMENTS

| | | | |
|---|---|---|---|
| 8,164,521 B2 | 4/2012 | Lee et al. | |
| 9,961,701 B2* | 5/2018 | Jain | ................ H04W 74/0866 |
| 2002/0041202 A1 | 4/2002 | Katz et al. | |
| 2007/0249402 A1 | 10/2007 | Dong et al. | |
| 2010/0064193 A1 | 3/2010 | Huschke et al. | |
| 2012/0202548 A1 | 8/2012 | Lee et al. | |
| 2013/0156120 A1* | 6/2013 | Josiam | ................ H04B 7/0697 375/260 |

* cited by examiner

*Primary Examiner* — Keith Ferguson
(74) *Attorney, Agent, or Firm* — Patent Portfolio Builders, PLLC (57) ABSTRACT

The present disclosure relates to a method 20 for broadcasting performed in a network node 11. The network node 11 is configured to broadcast information within a coverage area by using a directional beam. The method 20 comprises: determining 21 one or more directions for the directional beam based on a priori information about receiver $14_1, \ldots, 14_i, \ldots, 14_N$ locations within the coverage area, and broadcasting 22 the information in the determined one or more directions.

24 Claims, 4 Drawing Sheets

METHOD AND NETWORK NODE FOR BROADCASTING

TECHNICAL FIELD

The technology disclosed herein relates generally to the field of broadcasting in communication networks, and in particular to pseudo-omni broadcasting in such communication networks.

BACKGROUND

Directive transmission (also denoted directional transmission), wherein antennas may be pointed in different specific directions, is a way to improve capacity in a wireless network while also reducing interference. There are propagation conditions that require directive transmission, which may be realized by beamforming on a transmitting side to obtain good Signal to Interference-plus-Noise Ratio (SINR) conditions. Such propagation conditions arise for example in millimeter wavelength (MMW) bands, which bands may be used e.g. for wireless communication in ultra dense communication networks (UDN).

Figure 1:
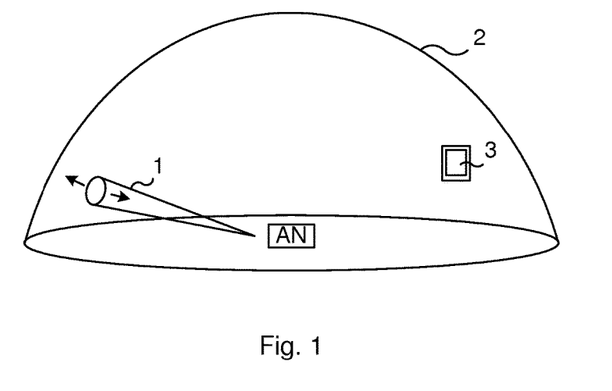
FIG. 1 illustrates a prior art beam sweeping approach.

There may be a need to broadcast information to all receivers in the vicinity of a transmitter in such situations, i.e. where the radio propagation conditions require directive transmission, the directive transmission in turn requiring beamforming. A current solution is then to use beam sweeping to cover the entire sphere around the transmitter or part of this sphere. FIG. 1 illustrates this current beam sweeping. A potentially narrow transmit beam 1 is swept in every direction to cover a certain desired area 2, such as the upper sphere around the transmitter. In FIG. 1, the transmitter is part of the access node denoted AN. In the broadcasting, the transmitter transmits the same information in every direction. In this way the transmission will reach all receiving communication devices 3 located close enough in any direction around the transmitter. This approach is sometimes denoted pseudo-omni broadcasting.

Broadcast signals should reach all potential receivers within the coverage area of the transmitter, and while this type of beam sweeping is adequate for many situations, it also entails drawbacks, for example in situations where there are only a few receivers in the area. The beam sweeping then radiates energy in many directions in which there are no receivers or only seldom are receivers and a lot of radiated energy will be wasted.

Further, the broadcast signal may reach a receiver quite late as a result of this beam sweeping. Such delays are particularly adverse for time critical applications, involving time critical broadcast signals.

Another way to perform the required broadcasting could be to code the signals heavily in time and use omni-directional broadcasting during a longer period of time. However, such solution is not always possible, e.g. due to antenna configurations. This solution further entails several drawbacks such as the broadcast transmissions being more difficult for the receivers to detect since the resulting received signal will have lower power and thus be more buried in noise.

SUMMARY

An object of the present disclosure is to solve or at least alleviate at least one of the above mentioned problems.

The object is according to a first aspect achieved by a method for broadcasting performed in a network node. The network node is configured to broadcast information within a coverage area by using a directional beam. The method comprises: determining one or more directions for the directional beam based on a priori information about receiver locations within the coverage area, and broadcasting the information in the determined one or more directions.

In contrast to the prior art beam sweeping approach, wherein communication resources e.g. in terms of frequency, code and/or time blocks, as well as energy, are wasted, the present disclosure allows the network node to, based on in advance known information (also denoted "a priori information" herein) about receiver locations, send the broadcast information to the receivers quicker than if a sequential or random beam sweep is used. Further, the network node may choose to not send the broadcast information in all directions but just in the most likely directions, hence saving power, and transmission time. The power and transmission time may instead be used e.g. for transmitting end user payload data or for saving energy in the network node.

The object is according to a second aspect achieved by a network node for broadcasting. The network node is configured to broadcast information within a coverage area by using a directional beam. The network node comprises a processor and memory, the memory containing instructions executable by the processor, whereby the network node is operative to: determine one or more directions for the directional beam based on a priori information about receiver locations within the coverage area, and broadcast the information in the determined one or more directions.

The object is according to a third aspect achieved by a computer program for a network node for broadcasting, the network node being configured to broadcast information within a coverage area by using a directional beam, the computer program comprising computer program code, which, when executed on the network node causes the network node to: determine one or more directions for the directional beam based on a priori information about receiver locations within the coverage area, and broadcast the information in the determined one or more directions.

The object is according to a fourth aspect achieved by a computer program product comprising a computer program as above, and a computer readable means on which the computer program is stored.

The object is according to a fifth aspect achieved by a network node configured to broadcast information within a coverage area by using a directional beam, the network node comprising: means for determining one or more directions for the directional beam based on a priori information about receiver locations within the coverage area, and means for broadcasting the information in the determined one or more directions.

Further features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In contrast to the prior art broadcasting using directional transmissions, wherein beam sweeping is performed blindly to cover an entire sphere, half-sphere or other corresponding surface around the transmitter that is performing the broadcasting, the present disclosure provides a more intelligent approach.

Briefly, the present disclosure uses a priori information about receiver locations, such as previous directions in which potential receivers have been present or directions which are more probable based on location of an access node performing the broadcasting and/or based on the surrounding environment. For example, the access node which is to do a beam sweeping may have communicated with other access nodes earlier thereby receiving information of potential receiver locations or may have received interference from certain directions, and such information may be used as the a priori information. As another example, the access node may be installed at the ceiling of a corridor and knowledge about new receivers being more likely to appear towards the ends of the corridor than directly underneath the transmitter may then be used as the a priori information. The access node transmits in the more likely directions first in order to, with a high probability, reach all of the receivers in the area in minimal time. The access node may optionally choose not to transmit the broadcast information in all directions. The transmitter may further adapt the amount of energy broadcasted in different directions based on the a priori information.

Figure 2:
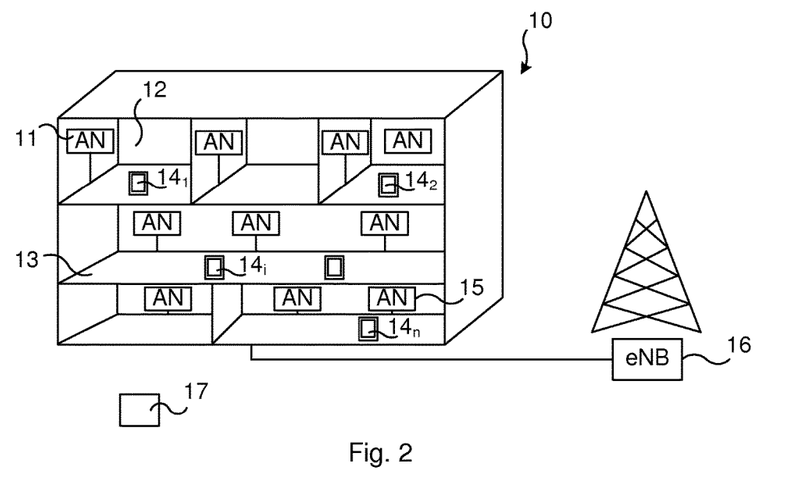
FIG. 2 illustrates schematically an environment in which embodiments of the present disclosure may be implemented.

FIG. 2 illustrates schematically an environment in which embodiments of the present disclosure may be implemented. Examples of such environments comprise ultra dense networks, wherein small cells using higher frequency spectrum, e.g. higher than 3 GHz, for communication are deployed. Such deployment of using ultra dense small cells in higher frequency spectrum, e.g. millimeter wavelength (MMW) spectrum is a way of addressing future capacity and data rate demands.

FIG. 2 exemplifies such environment 10 by an indoor environment in the form of a building comprising several floor levels and rooms 12 and corridors 13 in which users having receivers 14 reside. It is however noted that embodiments of the present disclosure may be implemented in outdoor environments as well. The receivers 14 may be any type of wireless devices, for example communication devices such as smart phones, laptops etc. It is noted that although referred to as receivers 14, devices comprising only receiving circuitry as well as devices comprising both receiving circuitry and transmitting circuitry are to be understood as being encompassed.

A number of access nodes 11 (also denoted AN in the figures) are placed throughout the environment in order to provide the receivers $14_1, 14_2, \ldots, 14_i, \ldots, 14_n$ with means for performing wireless communication. In particular, the access nodes 11 may provide the receivers $14_1, 14_2, \ldots, 14_i, \ldots, 14_n$ with wireless communication channels and are at least configurable to broadcast information to the receivers $14_1, 14_2, \ldots, 14_i, \ldots, 14_n$. The access node 11 may comprise any type of network node comprising at least a transmitter enabling the broadcasting of information. The access node 11 may for example comprise different types of base stations, e.g. an evolved node B (eNB), micro, pico or femto base stations or even the receivers $14_1, 14_2, \ldots, 14_i, \ldots, 14_n$ taking the role of an access node. In the broadcasting, the access node 11 transmits the same information in different directions. In the following such information is referred to as broadcast information. The access node 11 is configured to broadcast the broadcast information within a coverage area, for example a room 12, by using a directional beam. The access node 11 may in particular be configured to use the MMW band or other high frequency spectrum, e.g. higher than 3 GHz, for communication. The access nodes 11 may be connected to further network nodes, such as an eNB 16.

In accordance with the present disclosure, the access node 11 wishing to transmit a pseudo-omni broadcast signal intelligently chooses in which direction to start transmitting the broadcast information. The directions in which to transmit are chosen based on a priori information about receiver $14_1, \ldots, 14_i, \ldots, 14_N$ location within the coverage area. The choice may for example be based on one or more of: historical information e.g. directions in which previous receivers have been identified, information from other ANs, directions from which interference has been observed, observed path gain in certain directions, a priori configured information etc. Such examples are described in the following.

The historical information on in which directions the receivers $14_1, 14_2, \ldots, 14_i, \ldots, 14_n$ have previously been located may be used when deciding in which direction to send. The historical information may be stored in an internal database in the access node or in a database accessible by the access node 11. Such database is schematically illustrated in FIG. 2 and indicated by reference numeral 17. The receiver direction information (abbreviated RDI in the following) may be stored, e.g. using the format $(\theta_i, \phi_i, T_i)$, where $\theta_i$ and $\phi_i$ are the spherical coordinates specifying the direction to receiver i, and $T_i$ is the time stamp when receiver i was last known to be located in that direction. Alternatively it can be stored as $(a_i, T_i)$, where $a_i$ is a vector of antenna weights (transmit or receive antenna weights) associated with the receiver i, the antenna weights being e.g. the ones last used for the receiver.

It is noted that the historical information need not necessarily be stored on a per receiver $14_1, 14_2, \ldots, 14_i, \ldots, 14_n$ basis. In particular, directions (or antenna weights) that have been used a lot in the past can be stored, i.e. directions based on where many receivers have historically been located, e.g. directions corresponding to directions/locations where the user density tends to be high. This as opposed to storing the directions (or antenna weights) to each and every receiver $14_1, 14_2, \ldots, 14_i, \ldots, 14_n$. Alternatively, such historically often used directions may be used in addition to the stored directions to each receiver. The RDI can be stored for a set of grid points, e.g. 64 possible beam directions where coordinates may be rounded off to the nearest grid point. As another example, the complete coordinates for the RDI may be used and stored, e.g. in a database 17. In the former case it is possible to store for each direction $d_i$ the number m of receivers that have been detected in this direction, possibly with a forgetting factor such that only receivers $14_1$, $14_2, \ldots, 14_i, \ldots, 14_n$ detected no longer than a certain time t ago are counted. That is, a forgetting factor is set so as to weigh the data (i.e. the RDI) according to how recently it was obtained, setting the forgetting factor so that the most recent data is given more weight than older data.

Path gains or corresponding information may be stored in the database 17 in addition to the directions or antenna weights. With this information the access node 11 may adapt its radiated energy in different directions in view of various transmission parameters. For instance, in a certain direction multiple path gains may have been observed and a transmission in the corresponding direction would adapt its radiated energy or general transmission parameters such that a receiver with the poorest observed path gain would be able to successfully receive the broadcast information.

The access node 11 may be a priori configured such that certain directions are more probable than other. A certain direction may for example be more likely due to the placement of the access node 11 and the environment; for example, if the access node 11 is mounted in a ceiling, then a receiver $14_1, 14_2, \ldots, 14_i, \ldots, 14_n$ is more likely to be located within the half-sphere below the ceiling than within the half-sphere above the ceiling. Directions upwards, i.e. towards the ceiling, may therefore be eliminated as being unlikely directions. Such directions may thus be eliminated in a pre-configuration of the access node 11. Similarly, if the access node 11 is placed in a corner between two walls, then other parts of a sphere around the access node 11 may be deemed less likely to comprise a receiver $14_1, 14_2, \ldots, 14_i, \ldots, 14_n$. Similarly, if the access node 11 is placed in a corridor, then the directions towards the ends of the corridor may be deemed more likely than other directions.

As a way of implementation, directions that are more likely can be modeled by using a set of "detected" virtual receivers: if direction $d_i$ is probable (based e.g. on the placement of the access node) then $m_j+k_j$ receivers might be counted as having been detected there, where $m_j$ is a number of actual detections and $k_j$ is a base offset of virtual detections for that particular direction $d_j$. That is, adding virtual receivers in certain directions make these directions more important when deciding the sequence of pseudo-omni broadcast directions.

The access node 11 may additionally receive information from other access nodes 15, 16 which may be used in determining in which direction to broadcast. For example, the access node 11 may have communicated with another access node 15, 16 and be aware of a imminent handover and thereby a direction in which to expect a receiver.

The RDI is obtained and may be stored in the database 17 in, or accessible by, the access node 11 when each receiver $14_1, 14_2, \ldots, 14_i, \ldots, 14_n$ does its initial connection to the access node 11, i.e. transmits to the access node 11, and/or in every subsequent radio transmission from the receiver $14_1, 14_2, \ldots, 14_i, \ldots, 14_n$ to the access node 11. The access node 11 may use the incoming transmission and identify from which direction the transmission is coming. Such identification can be performed by using known techniques for multi-antenna receivers, e.g. by using a direction of arrival detection technique.

The access node 11 uses the RDI stored in the database 17 in order to calculate the most likely directions to all the receivers $14_1, 14_2, \ldots, 14_i, \ldots, 14_n$ to which it would like to transmit the broadcast information. The access node 11 performs its broadcast by using the directions obtained based on the RDI. The access node 11 may thereby with a high probability reach all the receivers $14_1, 14_2, \ldots, 14_i, \ldots, 14_n$ very quickly.

Registering RDI for all transmissions for a single receiver $14_i$ is useful in order to collect statistics to find the most likely directions in which receivers $14_1, 14_2, \ldots, 14_i, \ldots, 14_n$ may be located as well as for position tracking of the receiver $14_1, 14_2, \ldots, 14_i, \ldots, 14_n$, both for instantaneous information gathering as well as collecting statistics about receiver $14_1, 14_2, \ldots, 14_i, \ldots, 14_n$ movements, to make predictions more precise.

Figure 3:
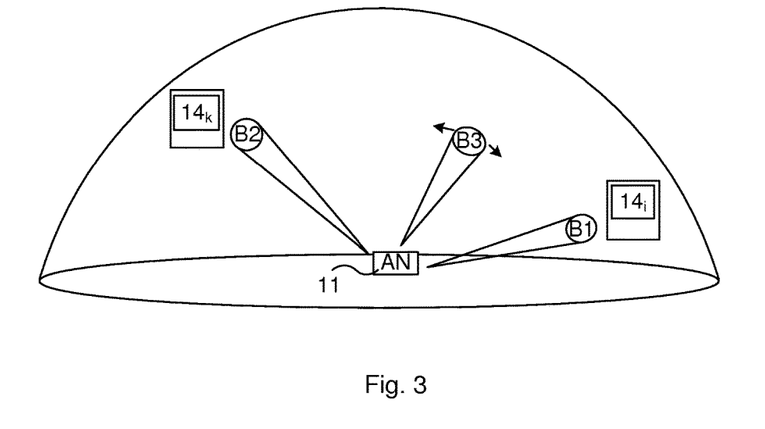
FIG. 3 illustrates a pseudo-omni broadcasting in an aspect of the present disclosure.

With reference now to FIG. 3 an illustrative example of intelligent pseudo-omni broadcasting will be described. The access node 11 starts transmitting in the direction of beam $B_1$, this direction corresponds to the most recently updated direction of the RDI. A receiver $14_i$ is with high probability present in this direction. Next, access node 11 transmits the broadcast information in the direction of beam $B_2$. This direction corresponds to the second most recently updated direction of the RDI. A receiver $14_k$ is with high probability present in this direction. In the illustrated case, where RDI is available only for the two receivers $14_i$ and $14_k$, the access node 11 has by now, with a high probability, reached all its intended receivers $14_1, 14_2, \ldots, 14_i, \ldots, 14_n$ with the broadcast information, assuming there are no other directions in the RDI and assuming that the probability for "unknown" potential receivers $14_1, 14_2, \ldots, 14_i, \ldots, 14_n$ is low.

In various embodiments, the access node 11 may also perform a conventional beam to sweeping to ensure reaching all receivers $14_1, 14_2, \ldots, 14_i, \ldots, 14_n$ in its coverage area, including receivers that may not have been previously communicating with the access node 11 and for which no RDI is yet available. This is illustrated by beam $B_3$, being swept in different directions eventually having covered all or close to all directions. Such conventional beam sweeping may be performed periodically, or when the probability of reaching all receivers is assessed (see equation (3) below for details on how this may be done) to be below a specified threshold. The threshold is chosen so that the probability of reaching all receivers is sufficiently high. The threshold may vary, or be set differently, depending e.g. on the importance of the broadcast message.

In another implementation according to the present disclosure the access node uses the available RDI to estimate the probability of reaching all the receivers $14_1, 14_2, \ldots, 14_i, \ldots, 14_n$. This is a suitable approach when the receivers $14_1, 14_2, \ldots, 14_i, \ldots, 14_n$ may be moving.

Next, an example is given on implementation of how to determine the probability of reaching all receivers $14_1, 14_2, \ldots, 14_i, \ldots, 14_n$. It is for example possible to use the diffusion equation on the sphere to find the probability distribution of all receivers $14_1, 14_2, \ldots, 14_i, \ldots, 14_n$ in each direction. Defining the probability distribution of finding receiver i in the direction $(\theta, \phi)$ at time t by:

$$\phi_i(\theta, \phi, t)$$

Then assuming a constant diffusion coefficient $d_i$, the time evolution of the probability $\phi_i(\theta,\phi,t)$ may be modeled by:

$$\frac{\partial}{\partial t}\phi_i(\theta, \phi, t) = d_i \nabla^2 \phi_i(\theta, \phi, t) \quad (1)$$

The initial conditions for this equation are given by:

$$\phi_i(\theta,\phi,t=T)=\delta(\theta-\theta_i)\delta(\phi-\phi_i)$$

where the $\delta(\cdot)$ is the Dirac delta function or by $$\phi_i(\theta, \phi, t = T) = \begin{cases} \text{Area}(B)^{-1}, & \text{for } \vec{r} \in B \\ 0, & \text{for } \vec{r} \notin B \end{cases}$$

where B is the region on the sphere within which the receiver is with certainty known to be at time $T_i$, and Area(B) is the area of region B. The diffusion constant $d_i$ is a parameter that may be adjusted to account for any expected movement of the receiver i. A suitable value may be derived from all historical RDI corresponding to receiver i.

The above partial differential equation (1) is readily solvable for the probability $\phi_i(\theta,\phi, t)$ by using conventional numerical methods, such as for example by using the finite elements method.

Figure 4:
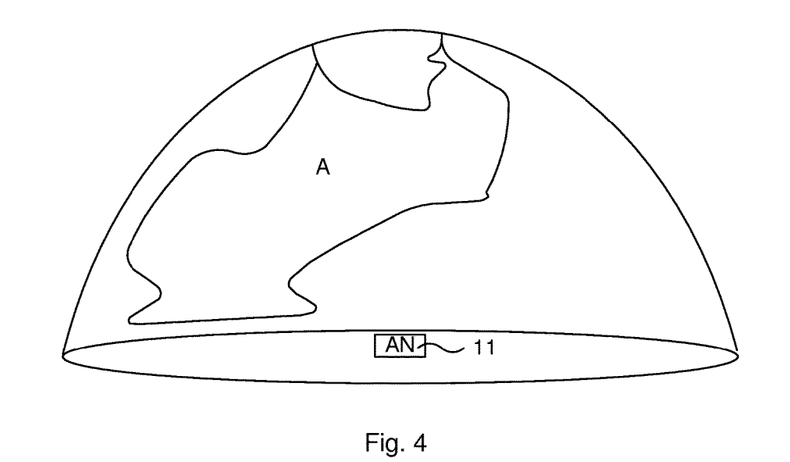
FIG. 4 is an illustration of probability calculations on receiver locations.

The probability of receiver i being in a given surface area A of the sphere (refer to FIG. 4) is given by:

$$P(A, t) = \int_A \phi_i(\theta, \phi, t) dS \quad (2)$$

and hence the access node 11 may straightforwardly calculate the probability of reaching every receiver $14_1$, $14_2$, ..., $14_i$, ..., $14_n$ at time t by transmitting over a given set of directions A:

$$P(A, t) = \prod_{i=1}^{n} P_i(A, t) = \prod_{i=1}^{n} \int_A \phi_i(\theta, \phi, t) dS \quad (3)$$

In an embodiment, the access node 11 may use the RDI for all access nodes, and derive for each receiver $14_1$, $14_2$, ..., $14_i$, ..., $14_n$ the probability $\phi_i(\theta, \phi, t)$ at the time of transmission t. Then the access node 11 constructs the sum $$N(\theta, \phi, t) = \sum_i \phi_i(\theta, \phi, t) \quad (4)$$

wherein N is within the range of o and the total number of receivers $14_1$, $14_2$, ..., $14_i$, ..., $14_n$ for which the access node 11 has RDI. The access node 11 now has information on the probabilities of reaching the receivers $14_1$, $14_2$, ..., $14_i$, ..., $14_n$ if it were to transmit in a given direction, obtained by integration over the directions.

The access node 11 may choose a threshold value thr for the number of receivers $14_1$, $14_2$, ..., $14_i$, ..., $14_n$. The threshold may thus be chosen arbitrarily in the range o to the total number of receivers $14_1$, $14_2$, ..., $14_i$, ..., $14_n$ for which the transmitter has RDI. The access node 11 constructs an area A by (see FIG. 4, wherein an exemplary area A is illustrated) using all directions such that $N(\theta,\phi,t) \geq thr$, i.e.

$$A(t)=\{(\theta,\phi)|N(\theta,\phi,t)\geq thr\}$$

The access node 11 now uses area A (again refer to FIG. 4), as comprising the directions in which to transmit. It may now use $$P_i(A, t) = \int_A N(\theta, \phi, t) dS$$

to calculate the expected number of receivers $14_1$, $14_2$, ..., $14_i$, ..., $14_n$ that will receive the broadcast information if directions specified by area A is used for transmission. If this number is too low the access node 11 may choose a lower value of the threshold thr and repeat the above steps. If the number is too high, the access node 11 increases the value of thr and repeats the above calculations.

If the access node 11 is satisfied with the expected number of reached receivers $14_1$, $14_2$, ..., $14_i$, ..., $14_n$ it transmits the broadcast information in the directions specified by the area A. This transmission is in one implementation done by beam sweeping over the area A.

In another implementation where a number $m_j$ of detections is associated with direction $d_j$ for j=1, ..., J it would be possible to transmit at each time in direction $d_j$ with a probability $P_j$, in accordance with $$P_j = \frac{[n_j]_N}{\sum_{i=1}^{J} [n_i]_N}$$

where $[x]_N=\max(x,N)$ i.e., the result is set to N if the input value is below N:

$$[x]_N = \max(x, N) = \begin{cases} x & \text{if } x \geq N \\ N & \text{if } x < N \end{cases}$$

Setting the value of N>o can be used to avoid that the probability of transmitting in certain directions becomes too low.

In yet another implementation the above $P_j$ can be calculated for all directions and then be sorted in decreasing order. Then the transmission can be performed in that order such that the directions with higher $P_j$ values are transmitted to first. In such a case N can be set to o since also a direction for which $P_j$ is o will eventually be used. In this case $P_j$ does denote a probability but rather a scoring of a certain direction.

Figure 5:
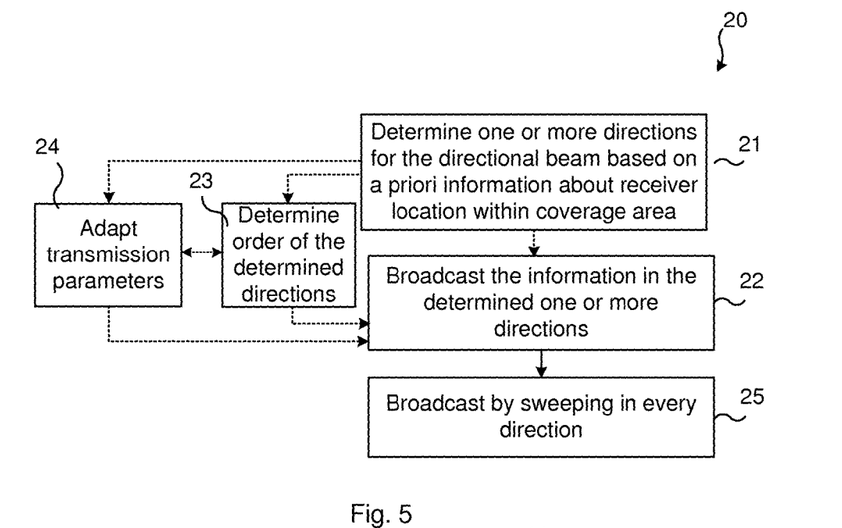
FIG. 5 illustrates a flow chart over steps of a method in a network node in accordance with the present disclosure.

FIG. 5 illustrates a flow chart over steps of a method in a network node, such as access node 11, in accordance with the present disclosure. In particular, a method 20 for broadcasting is provided. The method 20 is performed in a network node wherein the network node 11 is configured to broadcast information within a coverage area by using a directional beam. The coverage may for example be a particular cell (e.g. room 12 of FIG. 2) or a "beam space". Such beam space may then be seen as comprising the set of all directions from the network node 11 in which the network node 11 may radiate energy by adjusting the direction of the directional beam.

The method 20 comprises determining 21 one or more directions for the directional beam based on a priori information about receiver $14_1$, ..., $14_i$, ... $14_N$ location within the coverage area. The "a priori" information denotes information that the network node has before sending the broadcast information. The "a priori" information is thus to be understood as being based on information that the network node 11 has beforehand, or in advance, before it has any particular information about any particular receiver $14_i$. The information is a priori information in the sense that the receiver locations etc. are not confirmed by any potential responses to the transmission of the broadcast information. That is, the "a priori" information is not based solely on feedback that the network node 11 may have received from the particular receiver $14_i$. In embodiments of the method 20, the network node 11 may, once aware of such feedback based information, use also such information in determining directions in which to broadcast.

The method 20 comprises broadcasting 22 the information in the determined one or more directions.

By means of the method 20 the access node 11 is enabled to send the broadcast information to the receivers $14_1, \ldots, 14_i, \ldots 14_N$ quicker than the prior art solution of using a sequential or random beam sweep.

The steps of the method 20, i.e. the determining and broadcasting, are typically repeated. For example, in the determining 21 a sequence of directions in which to transmit may be determined, and then the broadcasting 22 is performed in the determined directions. As another example, the determining 21 may be performed for a single direction, then the broadcasting is made for that single direction, and then the steps are repeated. In such implementation a next direction determination may be based on the previous direction determination(s).

In an embodiment, the a priori information about the receiver $14_1, \ldots, 14_i, \ldots 14_N$ location comprises directions in which receivers $14_1, \ldots, 14_i, \ldots 14_N$ are presently located and/or in which receivers have previously been located. The determining 21 of a first chosen direction for the directional beam is based on a priori information about receiver behavior within the coverage area, and in particular based on a priori information about directions in which receivers $14_1, \ldots, 14_i, \ldots 14_N$ are presently located and/or in which receivers have previously been located.

In an embodiment, the method 20 comprises determining 23, before the broadcasting 22, an order of the directions in which to broadcast the information, and wherein the broadcasting 22 comprises broadcasting the information in the determined order. This order may be determined e.g. based on probability of reaching many receivers in a certain direction, the direction in which most receivers is believed to be reached is then being used first. As another example, historical information about directions in which many receivers have been found may be given higher weight, i.e. such directions may be used first.

This step 23 is optional, which is indicated in the FIG. 5 by dashed lines. That is, the determining 21 of directions may be followed by the determining 23 the order or followed by the broadcasting 22. The broadcasting 22 may thus be preceded by the step of determining 23 the order or by the determining 21 the directions. It is noted that the determining 23 the order and the determining 21 the directions may be seen as a single step for embodiments that comprises such determining 23 of order.

Further, the transmitter may allocate the total radiated energy differently in different directions, thereby increasing the chances that receivers are able to successfully decode the message. For example, if the a priori information reveals that receivers are likely to be present in a certain direction, and having a poor channel, a greater amount of radiated power in this direction would increase the total probability for those receivers being able to decode the broadcasted message.

In an embodiment, the determining 21 is further based on one or more of following: receiver $14_1, \ldots, 14_i, \ldots 14_N$ path gain, one or more previous determinations of directions, probability on reaching multiple receivers $14_1, \ldots, 14_i, \ldots 14_N$ within the coverage area in a single broadcasting, most recently updated receiver locations, pre-configured a priori information based on network node 11 placement, and information received from another network node 15, 16. The determining 21 directions is based on at least a priori information on receiver locations, but this information may be combined with further information. For example, in an embodiment, the a priori information about receiver locations may comprise historical information about receiver locations and the determining 21 comprises using this information together with information (known or calculated) on probability of reaching multiple receivers within the coverage area in a single broadcasting. In another embodiment, the determining 21 of directions is based on a priori information about receiver locations and information received from another network node 15, 16. The information received from the other network node 15, 16 may for example be information related to handover of a receiver $14_i$ from one node to the network node 11, which information may thus be used by the network node 11 in that it is made aware of approximate direction in which to expect a receiver $14_i$.

In an embodiment, the method 20 comprises adapting 24, for the broadcasting 22, transmission parameters of the broadcasting based on the one or more data. The adapting of transmission parameters may for example comprise one or more of: directing the directional beam in a determined direction for a longer duration, adapting the power level for a determined direction, adapting the used code rate and/or modulation for a determined direction, adapting the number of multiple-input, multiple output streams for a determined direction.

This step 24 is optional, which is indicated in the FIG. 5 by dashed lines. That is, the determining 21 of directions may be followed by the adapting 24 transmission parameters, or followed by the broadcasting 22. It is noted that the method 20 may be implemented comprising both the adapting 24 parameters and the determining 23 of order, which is indicated by the dashed line between boxes 23 and 24.

In a variation of the above embodiment, the adapting comprises using a first amount of radiated energy for receivers $14_1, \ldots, 14_i, \ldots 14_N$ in a direction for which the corresponding receivers $14_1, \ldots, 14_i, \ldots 14_N$ have a low path gain and a second amount of radiated energy for receivers $14_1, \ldots, 14_i, \ldots 14_N$ in a direction for which the corresponding receivers $14_1, \ldots, 14_i, \ldots 14_N$ have a high path gain, wherein the first amount of radiated energy is higher than the second amount of radiated energy. Further, the access node 11 may choose not to send the broadcast information in all directions but just in the most likely directions, hence saving power, and transmission time. The power and transmission time could then instead be used for transmitting end user payload data.

In an embodiment, the determining 21 comprises determining a first direction corresponding to a direction in which a receiver $14_1, \ldots, 14_i, \ldots 14_N$ is most likely located, and determining further directions corresponding, respectively, to directions in which a receiver $14_1, \ldots, 14_i, \ldots 14_N$ is located with a non-increasing order of likelihood.

The broadcasting 22 is then performed first in the first direction and then in the determined further directions in the non-increasing order of likelihood.

In variations of the above embodiment, in a direction in which several receivers are believed to reside, an adaptation of e.g. the transmission power can be made. For example, if a beam broadcast in a certain direction is believed to reach three receivers, then path gains historically registered for those receivers can be used for setting the appropriate transmission power, e.g. the power can be adapted such that the receiver with the worst path gain will be able to decode the broadcast information, and an additional margin may possibly be added.

In an embodiment, the determining 21 is adapted, based on the a priori information about receiver $14_1, \ldots, 14_i, \ldots 14_N$ location within the coverage area, such that the probability that multiple receivers $14_i, \ldots, 14_i, \ldots 14_N$ can be reached by the same broadcasting in one direction is increased. The broadcasting 22 thereby reaches multiple receivers simultaneously, saving time as well as energy. For example, the network node 11 may perform such adaptation by allocating the total radiated energy differently in different directions, thereby increasing the chances that receivers $14_1, \ldots, 14i, \ldots 14_N$ are able to successfully decode the message.

As a particular example, the adaptation may be based on the sum of probability distributions for the locations of or directions to the receivers $14_1, \ldots, 14_i, \ldots 14_N$, for which location information is available, in accordance with what has been described earlier.

In an embodiment, the determining 21 comprises using a model for the time evolution of the probability distributions for the locations of or directions to the receivers $14_1, \ldots, 14_i, \ldots 14_N$, for which location information is available, and determining the direction for the directional beam based thereon.

In a variation of the above embodiment, the model for time evolution of the probability for locations of the receivers $14_1, \ldots, 14_i, \ldots 14_N$ is based on the diffusion equation on a beam space, the beam space comprising a set of all directions from the network node 11 in which it may radiate energy by adjusting the direction of the directional beam.

In an embodiment, the method 20 comprises periodically broadcasting 25 the information by sweeping the directional beam over every direction within the coverage area. Such periodical broadcasting then covers the entire coverage area and all receivers residing within the coverage area are reached by the broadcast information. This optional step is indicated by a dashed line in the FIG. 5.

Figure 6:
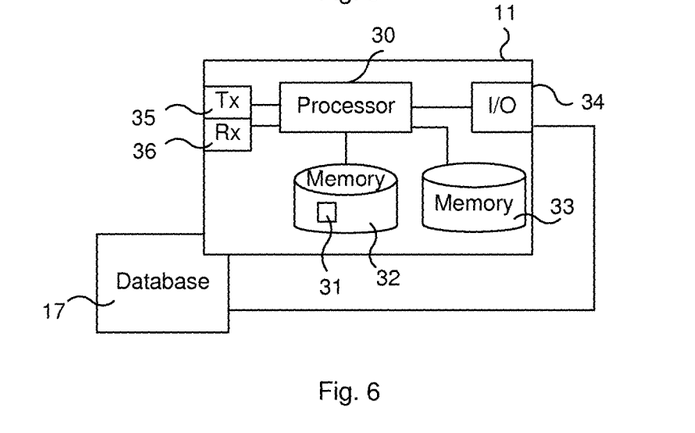
FIG. 6 illustrates schematically a network node and means for implementing methods of the present disclosure.

FIG. 6 illustrates schematically a network node and means for implementing methods of the present disclosure. The network node comprises a processor 30 comprising any combination of one or more of a central processing unit (CPU), multiprocessor, microcontroller, digital signal processor (DSP), application specific integrated circuit etc. capable of executing software instructions stored in a memory 32, which can thus be a computer program product 32. The processor 30 can be configured to execute any of the various embodiments of the method as has been described, for example in relation to FIG. 5.

In particular, a network node 11 for broadcasting is provided. The network node 11 is configured to broadcast information within a coverage area by using a directional beam. The network node 11 comprises a processor 30 and memory 32, the memory 32 containing instructions executable by the processor 30, whereby the network node 11 is operative to: determine one or more directions for the directional beam based on a priori information about receiver $14_1, \ldots 14_i, \ldots 14_N$ locations within the coverage area, and broadcast the information in the determined one or more directions.

In an embodiment, the network node 11 is preconfigured with information on one or more directions, which are excluded based on the placement of the network node 11. As described earlier, the network node 11 may be installed in a particular way, e.g. in a ceiling, that excludes certain directions since beams directed in such directions are unlikely to reach any receiver. Information about such directions may be preconfigured in the network node 11.

In an embodiment, the a priori information about the receiver $14_1, \ldots, 14_i, \ldots 14_N$ locations comprises directions in which receivers $14_1, \ldots, 14_i, \ldots 14_N$ are presently located and/or directions in which receivers have previously been located.

In an embodiment, the network node 11 is configured to determine, before the broadcasting, an order of the determined directions in which to broadcast the information, and configured to broadcast the information in the determined order.

In an embodiment, the network node 11 is configured to determine one or more directions based further on one or more of following data: receiver $14_1, \ldots, 14_i, \ldots 14_N$ path gain, one or more previous determinations of directions, probability of reaching multiple receivers $14_1, \ldots, 14_i, \ldots 14_N$ within the coverage area in a single broadcasting, most recently updated receiver locations, pre-configured a priori information based on network node 11 placement and information received from another network node 15, 16.

In an embodiment, the network node 11 is configured to adapt transmission parameters of the broadcasting based on the one or more of: receiver $14_1, \ldots, 14_i, \ldots 14_N$ path gain, one or more previous determinations of directions, probability on reaching multiple receivers $14_1, \ldots, 14_i, \ldots 14_N$ within the coverage area in a single broadcasting, historical information on directions in which receivers $14_1, \ldots, 14_i, \ldots 14_N$ have been located, most recently updated receiver locations, pre-configured a priori information based on network node 11 placement and information received from another network node 15, 16.

In an embodiment, the network node 11 is configured to adapt transmission parameters by one or more of: directing the directional beam in a determined direction for a longer duration, adapting the power level for a determined direction, adapting the used code rate and/or modulation for a determined direction, adapting the number of multiple-input, multiple output streams for a determined direction.

In an embodiment, the network node 11 is configured to adapt by using a first amount of radiated energy for receivers $14_1, \ldots, 14_i, \ldots 14_N$ in a direction for which the corresponding receivers $14_1, \ldots, 14_i, \ldots 14_N$ have a low path gain and a second amount of radiated energy for receivers $14_1, \ldots, 14_i, \ldots 14_N$ in a direction for which the corresponding receivers $14_1, \ldots, 14_i, \ldots 14_N$ have a high path gain, wherein the first amount of radiated energy is higher than the second amount of radiated energy.

In an embodiment, the network node 11 is configured to determine one or more directions by determining a first direction corresponding to a direction in which a receiver $14_1, \ldots, 14_i, \ldots 14_N$ is most likely located, and determining further directions corresponding, respectively, to directions in which a receiver $14_1, \ldots, 14_i, \ldots 14_N$ is located with a non-increasing order of likelihood, and wherein the broadcasting 22 is performed first in the first direction and then in the determined further directions in the non-increasing order of likelihood.

In an embodiment, the network node 11 is configured to adapt the determining based on the a priori information about receiver $14_1, \ldots, 14_i, \ldots 14_N$ location within the coverage area, such that the probability that multiple receivers can be reached by the same message broadcast in one direction is increased.

In an embodiment, the network node 11 is configured to determine the one or more directions by using a model for the time evolution of the probability distributions for the locations of the receivers $14_1, \ldots, 14_i, \ldots 14_N$ or directions to the receivers $14_1, \ldots, 14_i, \ldots 14_N$, for which location information is available, and determining the direction for the directional beam based thereon. The model for time evolution of the probability distributions for locations of the receivers $14_1, \ldots, 14_i, \ldots 14_N$ may for example be based on the diffusion equation on a beam space, the beam space comprising a set of all directions from the network node 11 in which it may radiate energy by adjusting the direction of the directional beam.

In an embodiment, the network node 11 is configured to periodically broadcast the information by sweeping the directional beam over every direction within the coverage area.

Still with reference to FIG. 6, the memory 32 can be any combination of read and write memory (RAM) and read only memory (ROM). The memory 32 also comprises persistent storage, which, for example, can be any single one or combination of magnetic memory, optical memory, solid state memory or even remotely mounted memory.

A data memory 33 may also be provided for reading and/or storing data during execution of software instructions in the processor 30. The data memory 33 can be any combination of read and write memory (RAM) and read only memory (ROM).

The network node 11 further comprises means for at least transmitting, and in particular for transmitting broadcast information. Such means may comprise a transmitter device 35, comprising for example transmitting circuitry, antennas etc. The network node 11 may further comprise means for receiving, and in particular for receiving wireless signaling from the receivers $14_1, \ldots, 14_i, \ldots 14_N$. Such means may comprise a receiver device 36, comprising for example receiving circuitry etc. Conventional receiving and transmitting means may be used, the details of which are omitted here for sake of brevity.

The network node 11 may further comprise a database 17. As mentioned earlier, such database 17 may be part of the network node 11 or may for example be a server comprising memory that is accessible by the network node 11, and in particular accessible by the processor 30 thereof. In FIG. 6, a line from an input/output device 34 illustrates that the database 17 is accessible by the network node 11, and in particular the processor 30 thereof. If the database 17 is part of the network node 11, the processor 30 may access data therefrom directly.

The disclosure of the present application also encompasses a computer program product 32 comprising a computer program 31 for implementing the methods as described above, and a computer readable means on which the computer program 31 is stored. The computer program product 32 may be any combination of read and write memory (RAM) or read only memory (ROM). The computer program product 32 may also comprise persistent storage, which for example can be any single one or combination of magnetic memory, optical memory or solid state memory.

The present disclosure thus also comprise a computer program 31 for a network node for broadcasting, the network node 11 being configured to broadcast information within a coverage area by using a directional beam. The computer program 31 comprising computer program code, which, when executed on the network node causes the network node 11 to: determine one or more directions for the directional beam based on a priori information about receiver 14 locations within the coverage area, and broadcast the information in the determined one or more directions.

The present disclosure further comprises the computer program product 32 comprising a computer program 31 as above and a computer readable means on which the computer program 31 is stored.

The computer program product, or the memory, thus comprises instructions executable by the processor. Such instructions may be comprised in a computer program, or in one or more software modules or function modules.

Figure 7:
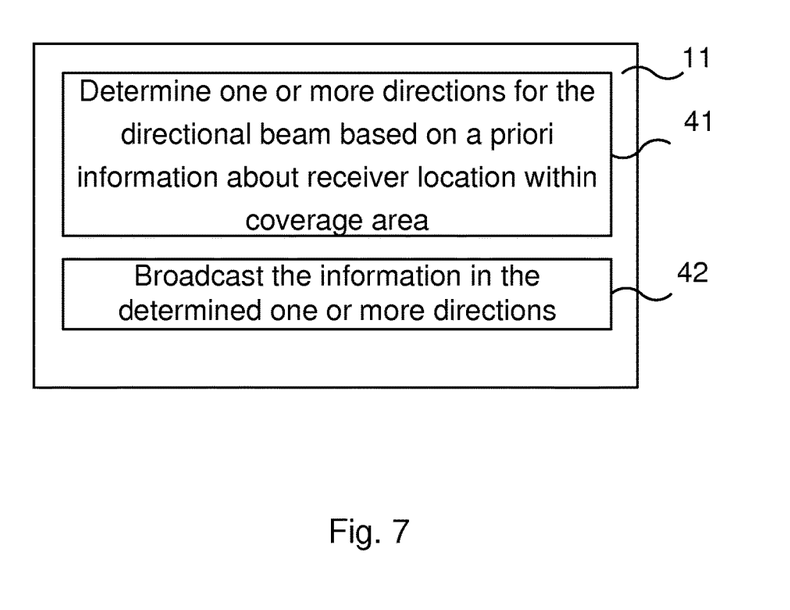
FIG. 7 illustrates a network node comprising function modules/software modules for implementing methods of the present disclosure.

An example of an implementation using function modules/software modules is illustrated in FIG. 7, in particular illustrating network node 11 comprising function modules for implementing methods of the present disclosure. The network node comprises means, in particular a first function module 41, for determining one or more directions for the directional beam based on a priori information about receiver $14_1, \ldots, 14_i, \ldots 14_N$ locations within the coverage area. The network node 11 comprises means, in particular a second function module 42 for broadcasting the information in the determined one or more directions.

The function modules 41, 42 can be implemented using software instructions such as computer program executing in a processor and/or using hardware, such as application specific integrated circuits, field programmable gate arrays, discrete logical components etc. Still further such function modules may be implemented for performing one or more of the features/steps of the various embodiments of the method as have been described.

It is thus noted that the a priori information about the receiver $14_1, \ldots, 14_i, \ldots 14_N$ location used by the first function module 41 may comprise directions in which receivers $14_1, \ldots, 14_i, \ldots 14_N$ are presently located and/or directions in which receivers have previously been located.

The network node 11 may further comprise a function module (not illustrated in the figures) for determining an order of the determined directions in which to broadcast the information. The second function module 42 then broadcasts the information in the order determined by this function module.

The first function module 41 may determine one or more directions further based on one or more of following data: receiver $14_1, \ldots, 14_i, \ldots, 14_N$ path gain, one or more previous determinations of directions, probability of reaching multiple receivers $14_1, \ldots, 14_i, \ldots, 14_N$ within the coverage area in a single broadcasting, most recently updated receiver locations, pre-configured a priori information based on network node 11 placement and information received from another network node 15, 16.

The network node 11 may further comprise a function module (not illustrated in the figures) for adapting transmission parameters of the broadcasting based on one or more of: receiver $14_1, \ldots, 14_i, \ldots 14_N$ path gain, one or more previous determinations of directions, probability on reaching multiple receivers $14_1, \ldots, 14_i, \ldots 14_N$ within the coverage area in a single broadcasting, historical information on directions in which receivers $14_1, \ldots, 14_i, \ldots 14_N$ have been located, most recently updated receiver locations, pre-configured a priori information based on network node 11 placement and information received from another network node 15, 16.

The above function module for adapting transmission parameters may comprise one or more of: directing the directional beam in a determined direction for a longer duration, adapting the power level for a determined direction, adapting the used code rate and/or modulation for a determined direction, adapting the number of multiple-input, multiple output streams for a determined direction.

The function module for adapting may comprise using a first amount of radiated energy for receivers $14_1, \ldots, 14_i, \ldots 14_N$ in a direction for which the corresponding receivers $14_1, \ldots, 14_i, \ldots 14_N$ have a low path gain and a second amount of radiated energy for receivers $14_1, \ldots, 14_i, \ldots 14_N$ in a direction for which the corresponding receivers $14_1, \ldots, 14_i, \ldots 14_N$ have a high path gain, wherein the first amount of radiated energy is higher than the second amount of radiated energy.

The first function module 41 for determining one or more directions may comprise determining a first direction corresponding to a direction in which a receiver $14_1, \ldots, 14_i, \ldots 14_N$ is most likely located, and determining further directions corresponding, respectively, to directions in which a receiver $14_1, \ldots, 14_i, \ldots, 14_N$ is located with a non-increasing order of likelihood. The second function module 42 then broadcasts first in the first direction and then in the determined further directions in the non-increasing order of likelihood.

The first function module 41 for determining one or more directions may adapt the determining, based on the a priori information about receiver $14_1, \ldots, 14_i, \ldots 14_N$ location within the coverage area, such that the probability that multiple receivers can be reached by the same message broadcast in one direction is increased.

The first function module 41 for determining one or more directions may comprise using a model for the time evolution of the probability distributions for the locations of the receivers $14_1, \ldots, 14_i, \ldots 14_N$ or directions to the receivers $14_1, \ldots, 14_i, \ldots 14_N$, for which location information is available, and determining the direction for the directional beam based thereon.

In the above embodiment of the first function module 41, the model for time evolution of the probability distributions for locations of the receivers $14_1, \ldots, 14_i, \ldots 14_N$ may be based on the diffusion equation on a beam space, the beam space comprising a set of all directions from the network node 11 in which it may radiate energy by adjusting the direction of the directional beam.

The network node 11 may further comprise a function module (not illustrated in the figures) for periodically broadcasting the information by sweeping the directional beam over every direction within the coverage area.

Modifications of the disclosed embodiments and other embodiments will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for broadcasting performed in a network node, the network node being configured to broadcast information within a coverage area by using a directional beam, the method comprising:
   determining one or more directions for the directional beam based on a priori information about receiver locations within the coverage area, wherein the a priori information about the receiver locations comprises directions in which receivers are presently located and/or directions in which the receivers have been previously located, wherein the determining the one or more directions comprises determining further directions corresponding, respectively, to directions in which the receivers are located with a non-increasing order of likelihood; and
   broadcasting the information in the determined one or more directions, wherein the broadcasting is performed first in a first direction and then in the determined further directions in the non-increasing order of likelihood.

2. The method of claim 1, further comprising determining, before the broadcasting, an order of the determined one or more directions in which to broadcast the information, wherein the broadcasting comprises broadcasting the information in the determined order.

3. The method of claim 1, wherein the determining the one or more directions is further based on one or more of: a receiver path gain, one or more previous determinations of directions, a probability of reaching multiple receivers within the coverage area in a single broadcasting, most recently updated receiver locations, pre-configured a priori information based on a placement of the network node, and information received from another network node.

4. The method of claim 1, further comprising adapting transmission parameters of the broadcasting based on one or more of: a receiver path gain, one or more previous determinations of directions, a probability on reaching multiple receivers within the coverage area in a single broadcasting, historical information on directions in which the receivers have been located, most recently updated receiver locations, pre-configured a priori information based on a placement of the network node, and information received from another network node.

5. The method of claim 4, wherein the adapting the transmission parameters comprises one or more of: directing the directional beam in a determined direction for a longer duration, adapting a power level for a determined direction, adapting a used code rate and/or modulation for a determined direction, and adapting a number of multiple-input, multiple output streams for a determined direction.

6. The method of claim 4, wherein the adapting the transmission parameters comprises using a first amount of radiated energy for the receivers in a direction for which corresponding receivers have a low path gain and a second amount of radiated energy for the receivers in a direction for which corresponding receivers have a high path gain, and wherein the first amount of radiated energy is higher than the second amount of radiated energy.

7. The method of claim 1, wherein the determining the one or more directions further comprises determining the first direction corresponding to a direction in which a receiver is most likely located.

8. The method of claim 1, wherein the determining the one or more directions is adapted, based on the a priori information about the receiver locations within the coverage area, such that a probability that multiple receivers can be reached by same message broadcast in one direction is increased.

9. The method of claim 1, wherein the determining the one or more directions further comprises using a model for a time evolution of probability distributions for locations of the receivers or directions to the receivers, for which location information is available, and determining the one or more directions for the directional beam based thereon.

10. The method of claim 9, wherein the model for the time evolution of the probability distributions is based on a diffusion equation on a beam space, the beam space comprising a set of all directions from the network node in which the beam space radiates energy by adjusting the determined one or more directions for the directional beam.

11. The method of claim 1, further comprising periodically broadcasting the information by sweeping the directional beam over every direction within the coverage area.

12. A network node for broadcasting, the network node being configured to broadcast information within a coverage area by using a directional beam, the network node comprising:
a processing circuit configured to determine one or more directions for the directional beam based on a priori information about receiver locations within the coverage area; and
a transmitter configured to broadcast the information in the determined one or more directions,
wherein the processing circuit is preconfigured with data on one or more directions that are excluded based on a placement of the network node.

13. The network node of claim 12, wherein the a priori information about the receiver locations comprises directions in which receivers are presently located and/or directions in which the receivers have been previously located.

14. The network node of claim 12, wherein the processing circuit is configured to determine, before the broadcasting, an order of the determined one or more directions in which to broadcast the information, and wherein the network node is configured to broadcast the information in the determined order.

15. The network node of claim 12, wherein the processing circuit is configured to determine the one or more directions further based on one or more of: a receiver path gain, one or more previous determinations of directions, a probability of reaching multiple receivers within the coverage area in a single broadcasting, most recently updated receiver locations, pre-configured a priori information based on the placement of the network node, and information received from another network node.

16. The network node of claim 12, wherein the processing circuit is configured to adapt transmission parameters of the broadcasting based on one or more of: a receiver path gain, one or more previous determinations of directions, a probability on reaching multiple receivers within the coverage area in a single broadcasting, historical information on directions in which receivers have been located, most recently updated receiver locations, pre-configured a priori information based on the placement of the network node, and information received from another network node.

17. The network node of claim 16, wherein the processing circuit is configured to adapt the transmission parameters by one or more of: directing the directional beam in a determined direction for a longer duration, adapting a power level for a determined direction, adapting a used code rate and/or modulation for a determined direction, and adapting a number of multiple-input, multiple output streams for a determined direction.

18. The network node of claim 16, wherein the processing circuit is configured to adapt the transmission parameters by using a first amount of radiated energy for the receivers in a direction for which corresponding receivers have a low path gain and a second amount of radiated energy for the receivers in a direction for which corresponding receivers have a high path gain, and wherein the first amount of radiated energy is higher than the second amount of radiated energy.

19. The network node of claim 12, wherein the processing circuit is configured to determine the one or more directions by determining a first direction corresponding to a direction in which receivers are most likely located, and determining further directions corresponding, respectively, to directions in which receivers are located with a non-increasing order of likelihood, and wherein the transmitter is configured to broadcast the information first in the first direction and then in the determined further directions in the non-increasing order of likelihood.

20. The network node of claim 12, wherein the processing circuit is configured to adapt the determination of the one or more directions based on the a priori information about the receiver locations within the coverage area, such that a probability that multiple receivers can be reached by same message broadcast in one direction is increased.

21. The network node of claim 12, wherein the processing circuit is configured to determine the one or more directions by using a model for a time evolution of probability distributions for locations of receivers or directions to receivers, for which location information is available, and determining the one or more directions for the directional beam based thereon.

22. The network node of claim 21, wherein the model for the time evolution of the probability distributions is based on a diffusion equation on a beam space, the beam space comprising a set of all directions from the network node in which the beam space radiates energy by adjusting the determined one or more directions for the directional beam.

23. The network node of claim 12, wherein the transmitter is configured to periodically broadcast the information by sweeping the directional beam over every direction within the coverage area.

24. A non-transitory computer-readable storage medium storing a computer program for a network node for broadcasting, the network node being configured to broadcast information within a coverage area by using a directional beam, the computer program comprising computer program code that, when executed on at least one processor of the network node, causes the network node to:
determine one or more directions for the directional beam based on a priori information about receiver locations within the coverage area, wherein the a priori information about the receiver locations comprises directions in which receivers are presently located and/or directions in which the receivers have been previously located, wherein the determination of the one or more directions comprises a determination of further directions corresponding, respectively, to directions in which the receivers are located with a non-increasing order of likelihood; and
broadcast the information in the determined one or more directions, wherein the broadcasting is performed first in a first direction and then in the determined further directions in the non-increasing order of likelihood.

* * * * *